United States Patent [19]
Dähler et al.

[11] Patent Number: 5,793,622
[45] Date of Patent: Aug. 11, 1998

[54] COMMON TURN-OFF CIRCUIT FOR A THYRISTOR POWER CONVERTER

[75] Inventors: Peter Dähler, Remigen; Osvin Gaupp, Baden; Gerhard O. Linhofer, Dättwil; Christoph Tschudi, Untersiggenthal, all of Switzerland

[73] Assignee: Asea Brown Boveri AG, Baden, Switzerland

[21] Appl. No.: 738,286

[22] Filed: Oct. 25, 1996

[30] Foreign Application Priority Data

Oct. 25, 1995 [DE] Germany ............... 195 39 573.5

[51] Int. Cl.$^6$ ............................................. H02J 3/00
[52] U.S. Cl. ............................. 363/34; 363/54; 363/37; 363/129; 307/42
[58] Field of Search .................. 363/54, 51, 129, 363/128, 57, 34, 135, 35, 37; 307/42

[56] References Cited

U.S. PATENT DOCUMENTS

| | | | |
|---|---|---|---|
| 3,639,818 | 2/1972 | Wiart | 318/138 |
| 4,563,619 | 1/1986 | Davis et al. | 318/138 |
| 4,581,573 | 4/1986 | Dobsa et al. | 323/356 |
| 4,661,763 | 4/1987 | Ari et al. | 323/215 |
| 5,204,548 | 4/1993 | Dahler et al. | 307/66 |

FOREIGN PATENT DOCUMENTS

3217677 A1  12/1982  Germany.
3142611 A1  5/1983   Germany.

OTHER PUBLICATIONS

D. Alexa, "Optimal Areitender unsymmetrischer selbstgefuhrter stromirichter", etzArchiv Bd. 7 (1985) H.12, pp. 409–411.

Werner Bosterling et al, Moderne Leistungshalbleiter in der Stromrichtertechnik, etzBd. 114 (1993) Heft 2, pp. 1310–1319.

Herausgegeben von Rudolf Lappe, "Leistungselektronik", Springer-Verlag Berlin Heidelberg New York London, Paris, Tokyo 1988, pp. 284–297.

Primary Examiner—Peter S. Wong
Assistant Examiner—Shawn Riley
Attorney, Agent, or Firm—Oblon, Spivak, McClelland, Maier, Neustadt, P.C.

[57] ABSTRACT

A common turn-off circuit for a thyristor power converter is specified. The common turn-off circuit is particularly suitable for AC converters such as, for example, railway grid couplings. The turn-off thyristors are directly connected to the secondary transformer windings. Additionally provided is a special freewheeling path via which the energy stored, in particular, in the transformer inductors or other relevant inductors can be drawn away. What is advantageous is the fact that all of the thyristors of the power converter can be turned off reliably and without any special precautions, since the common turn-off circuit is automatically ready for turning off. Overvoltages are avoided, moreover, by the special freewheeling path.

12 Claims, 2 Drawing Sheets

COMMON TURN-OFF CIRCUIT FOR A THYRISTOR POWER CONVERTER

BACKGROUND OF THE INVENTION

1. Field of the Invention

The invention relates to the field of power electronics. It is more particularly related to a common turn-off circuit for a thyristor power converter.

2. Discussion of Background

A turn-off circuit is described in the article "Moderne Leistungshalbleiter in der Stromrichtertechnik" [Modern power semiconductors in power converter technology, Vol. 114 (1993) Issue 21, pages 1310–1319].

Turn-off circuits are required to turn off thyristors of a power converter. A turn-off circuit is also required, for example, for thyristor power converters which can operate both in an invertor mode and in a rectifier mode and are connected on the DC side to a voltage intermediate circuit, the voltage of the intermediate circuit being fed, for example, from a battery, a self-commutated voltage converter or from another suitable source. Such a thyristor power converter may be part of an AC voltage converter arrangement, in which a first power converter is connected to a first, preferably polyphase voltage supply grid (for example 50 Hz) and a second power converter is connected to a second voltage supply grid (for example 16.67 Hz), the first and second power converters being coupled to one another via the intermediate circuit. For extremely high powers, such as are required, for example, for steady-state railway grid couplings or high-voltage DC transmission, thyristors are advantageously used for the first power converter. In the case of such a circuit, the turn-off circuit of this first power converter acquires an important protective function, namely, if a commutation fault occurs in the invertor mode of the thyristor power converter, then the current cannot be limited by either the first thyristor power converter or the second power converter typically a GTO power converter, on the rail side, for example. This fault situation requires a protective system which rapidly and reliably turns off all of the current-carrying thyristors of the first power converter and thus protects them against overloading.

A number of different variants of turn-off circuits are specified on pages 284–297 of the reference book "Leistungselektronik" [Power electronics], edited by Rudolf Lappe, Springer-Verlag 1988. The most complex, but most flexible variant is that of individual turn-off. In this case, a dedicated turn-off device is provided for each bridge path. However, this variant is too expensive and complex for a railway grid coupling. The turn-off operation in the next variant, so-called phase-sequence commutation, is based on the fact that the current is commutated from the respective current-carrying thyristor by triggering the chronologically succeeding thyristor in the next phase of the same bridge half. Complete disconnection from the grid is not possible with a circuit of this type. The next variant described is that of phase commutation. In this variant, the turn-off circuit is formed by a series resonant circuit comprising a turn-off capacitor and a commutation inductor. However, this circuit is also not suitable for the problem to be solved, since the main thyristors of a bridge arm are turned off alternately. Finally, central or common turn-off circuits are also described. Although these variants enable all of the bridge paths to be turned off by means of a single central turn-off capacitor, they would be too complex for the required objective, since the purpose of enabling the turn-off capacitor to receive the energy stored in the transformer inductors and relevant smoothing inductors without the formation of overvoltages would necessitate derating said turn-off capacitor in such a way that the entire circuit arrangement would no longer be economical.

SUMMARY OF THE INVENTION

Accordingly, one object of the invention is to provide a novel common turn-off circuit for a thyristor power converter which turns off all of the current-carrying thyristors in an economical and sufficiently rapid and reliable manner, without the energy stored in the transformer inductors and relevant smoothing inductors causing impermissible overvoltages across the thyristors and the turn-off capacitor.

This object is achieved, in the case of a common turn-off circuit of the type mentioned in the introduction, by the features of the first claim.

The core of the invention, then, is that the turn-off thyristors are not connected to the DC voltage connections of the intermediate circuit, but directly to the transformer. In addition, the common turn-off circuit is designed automatically to produce freewheeling for a current flowing through the inductors of the circuit during the turn-off operation.

A circuit variant in which overcharging of the turn-off capacitor can be reliably avoided is particularly preferred. This is achieved by virtue of the fact that the voltage across the turn-off capacitor is essentially fixed at the value of the intermediate circuit voltage. A further advantage of the structure according to the invention is that the voltage intermediate circuit automatically precharges the turn-off capacitor with the correct polarity for the turn-off operation. As a result, the common turn-off circuit is automatically put into a state of readiness for turning off again after a turn-off operation.

The circuit can be used both for 12-pulse circuits and, with minor adaptations, for 6-pulse circuits. Further exemplary embodiments emerge from the corresponding dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
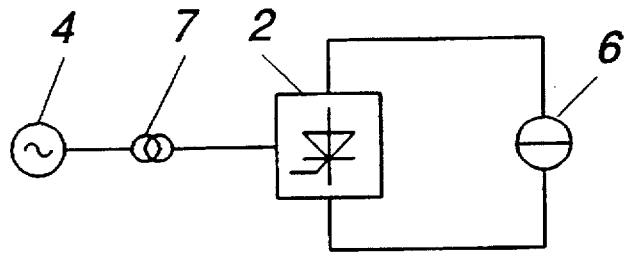
FIG. 1 shows a block diagram of a circuit arrangement having a thyristor power converter which is connected to a DC voltage intermediate circuit.

Referring now to the drawings, wherein like reference numerals designate identical or corresponding parts throughout the several views, FIG. 1 shows the block diagram of a circuit arrangement having a thyristor power converter 2 which is connected to a DC voltage intermediate circuit 6. The DC voltage intermediate circuit 6 can be formed, for example, by a battery or by a self-commutated voltage converter or by another suitable voltage source.

The common turn-off circuit according to the invention has been realized in a circuit arrangement having a self-commutated voltage converter and is explained below using the example of a railway grid coupling. However, the invention is not restricted to this type of circuit.

In FIG. 1, 4 designates a first AC voltage grid, for example the 50 Hz national grid. A first power converter 2 is connected to the first AC voltage grid 4. The power converter 2 is connected to a second power converter (not illustrated for the sake of clarity) via a DC voltage intermediate circuit 6. A second AC voltage grid, for example a 16 ⅔ Hz railway grid, is connected to the second power converter. The task of the railway grid coupling is to release energy either from the first grid 4 into the second grid or vice versa. For economic reasons, a circuit equipped with conventional thyristors is still used for the first power converter 2.

If a commutation fault occurs in the invertor mode of the first power converter 2, then the current cannot be limited neither by the thyristor power converter 2 or the second power converter on the rail side, generally a GTO converter. The only remaining turn-off device is a power circuit-breaker provided on the rail side. During the switching time of the power circuit-breaker (1 to 2 periods of the second grid=60 to 120 ms), the second grid feeds power to the thyristor power converter 2 via the diodes of the second power converter equipped with GTOs. The thyristors of the power converter do not survive this enormous loading without damage.

Therefore, it is necessary to provide a common turn-off circuit which can rapidly and reliably turn off the thyristors of the first power converter 2 and is automatically ready for turning off without any special precautions. However, since the energy stored in the inductors of the circuit, above all in the power converter transformer inductors and relevant smoothing inductors, can lead to overvoltages in the turn-off capacitor and across the thyristors, in the case of the known solutions said turn-off capacitor would have to be derated in such a way that the circuit would become much too expensive. Therefore, special common turn-off circuit which meets the above requirements economically is needed.

Figure 2:
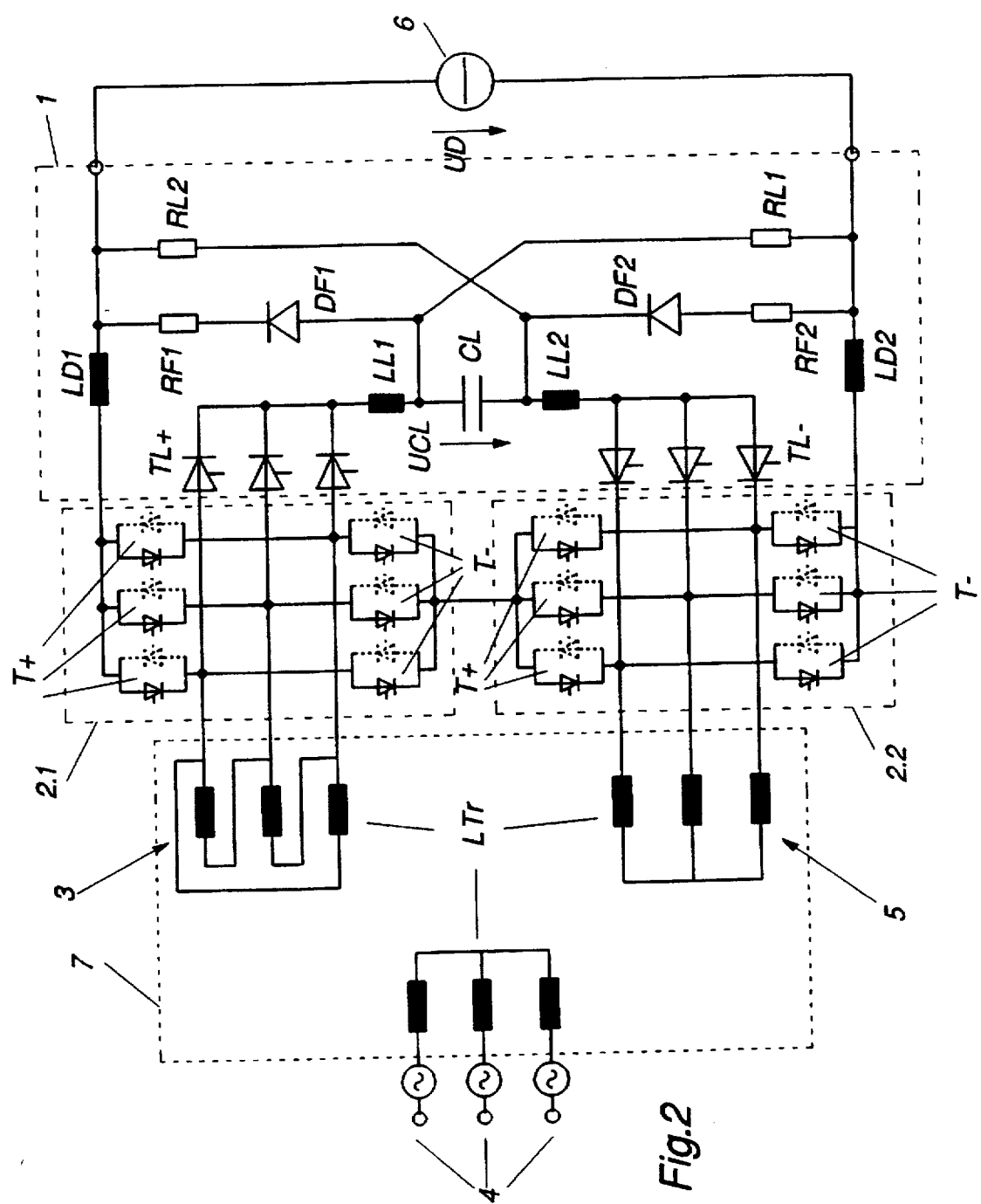
FIG. 2 shows an equivalent circuit diagram of a common turn-off circuit according to the invention which is suitable for a 12-pulse power converter.

FIG. 2 shows the equivalent circuit of a common turn-off circuit 1 of this type, which is suitable for a 12-pulse thyristor power converter. A voltage supply grid 4 is provided and is connected to the thyristor power converter via a transformer 7 having two winding groups 3 and 5. The first winding group 3 is delta-connected, and the second winding group 5 is star-connected. A thyristor power converter element 2.1 or 2.2 is connected to each winding group. The thyristor power converters are equipped with reverse-connected parallel thyristors T+ and T−. Only the thyristors illustrated by solid lines conduct current for the invertor mode of the thyristor power converter under consideration here. The remaining thyristors, which are active in the rectifier mode, are illustrated by dashed lines. Unless expressly stated to the contrary, it is always the thyristors drawn with solid lines that are considered in the following description. The power converter elements 2.1 and 2.2 are connected on the one hand to one another and on the other hand to the positive and negative pole, respectively, of a DC voltage intermediate circuit 6, illustrated by a voltage source.

In the following text, the thyristors T− of the lower commutation groups of the power converter element 2.1 in FIG. 3 and the thyristors T+ of the upper commutation groups of the power converter element 2.2 are referred to as "inner" thyristors. The thyristors T+ and T− of those commutation groups of the power converter elements 2.1 and 2.2, respectively, which are connected to the DC voltage intermediate circuit connections are referred to as "outer" thyristors.

As its main component parts, the turn-off circuit 1 comprises a turn-off thyristor $T_{L+}$ or $T_{L-}$ for each phase of the grid or for each bridge path of the thyristor power converters 2.1 and 2.2. Said turn-off thyristors serve as switches to reverse the charge of energy stored in a turn-off capacitor $C_L$ and thus to turn off the thyristors T+ or T− of the power converters 2.1 and 2.2.

The circuit arrangement has the following features. The anodes of the turn-off thyristors $T_{L+}$ of the power converter element 2.1 connected to the delta-connected winding group 3 are connected to the phase connections of the power converter. The cathodes form a first common node. In the case of the second power converter element 2.2, the cathode and anode of the turn-off thyristors $T_{L-}$ are reversed, and the anodes of the turn-off thyristors form a second common node.

The abovementioned turn-off capacitor $C_L$ is arranged between the common nodes. In addition, a respective turn-off inductor $L_{L1}$ and $L_{L2}$ is inserted between the first and the second common node and the connections of the turn-off capacitor $C_L$. The common junction point between the turn-off inductor $L_{L1}$ connected to the first common node and the turn-off capacitor $C_L$ is now connected, on the one hand, to the positive pole of the DC voltage intermediate circuit 6 via a series circuit formed by a first freewheeling diode $D_{F1}$ and a first freewheeling resistor $R_{F1}$ and, on the other hand, to the negative pole of the DC voltage intermediate circuit 6 via a first charge reversal resistor $R_{L1}$. In contrast, the common junction point between the turn-off inductor $L_{L2}$ connected to the second common node and the turn-off capacitor $C_L$ is connected, on the one hand, to the negative pole of the DC voltage intermediate circuit 6 via a series circuit formed by a second freewheeling diode $D_{F2}$ and a second freewheeling resistor $R_{F2}$ and, on the other hand, to the positive pole of the DC voltage intermediate circuit 6 via a second charge reversal resistor $R_{L2}$. Smoothing inductors $L_{D1}$ and $L_{D2}$ may additionally be provided between the intermediate circuit connections of the power converters 2.1 and 2.2.

The circuit functions as follows. In the normal invertor mode of the power converter, the turn-off capacitor $C_L$ is charged to the negative intermediate circuit voltage $(-U_D)$ via the charge reversal resistors $R_{L1}$ and $R_{L2}$. The turn-off thyristors $T_{L+-}$ and the freewheeling diodes $D_{F1}$, $D_{F2}$ are switched off. If a commutation fault is detected in the invertor mode,—for example by detecting a commutation failure of the invertor,—then the control system transmits a brief triggering command typically lasting 200 μs to all six turn-off thyristors $T_{L+}$ and $T_{L-}$. Both the thyristor power converters 2.1 and 2.2 and the GTO power converter connected downstream of the DC voltage intermediate circuit are blocked at the same time. This ensures that it is no longer possible to initiate any new commutations.

As a result of the triggering of all the turn-off thyristors, the current commutates very rapidly from the "inner" thyristors T− and T+ of the power converters 2.1 and 2.2 into the current path $T_{L+}-L_{L1}-C_L-L_{L2}-T_{L-}$ of the turn-off circuit. Apart from the inductors $L_{L1}$ and $L_{L2}$, the turn-off circuit has a low inductance, resulting in a commutation operation that takes place comparatively quickly. The inductors $L_{L1}$ and $L_{L2}$ in this case limit the current rise in the turn-off thyristors and serve to set the rate of current rise to the permissible degree $dI_{TL}/dt=U_{Dmax}/(L_{L1}+L_{L2})$. Apart from a small discharge, the voltage across the turn-off capacitor $C_L$ is still $(-U_D)$. This operation is called the primary turn-off operation.

The time $t_{L1}$ until the current in the thyristors of the power converters 2.1 and 2.2 reaches zero can be determined as follows:

$$t_{L1} = \sqrt{(L_{L1}+L_{L2})C_L} \cdot a\sin\left(\frac{I_L}{U_{CL}} \cdot \sqrt{\frac{L_L}{C_L}}\right)$$

This operation is followed by the so-called secondary turn-off operation, in which it is necessary likewise to turn off the thyristors still carrying current, the "outer" thyristors and the turn-off thyristors. The current through the turn-off capacitor rises on account of the energy stored in the inductors, in particular the transformer inductors $L_T$, and the smoothing inductors $L_{D1}$, $L_{D2}$ and on account of the driving intermediate circuit. As a consequence of the current which is continuing to rise, the polarity of the voltage across the turn-off capacitor $U_{CL}$ is reversed. As soon as the value of the intermediate circuit voltage is reached, the freewheeling paths $D_{F1}$, $R_{F1}$ and $D_{F2}$, $R_{F2}$ automatically become active and prevent overcharging of the turn-off capacitor. The degree of capacitor overcharging is controlled by the dimensioning of the freewheeling resistors $R_{F1}$, $R_{F2}$. The remaining current now flows, on the one hand, through the outer thyristors T+ of the power converter element 2.1, through the turn-off thyristors $T_{L+}$, $L_{L1}$ and the first freewheeling path ($D_{F1}$, $R_{F1}$) and, on the other hand, through the outer thyristors T− of the power converter element 2.2, through the turn-off thyristors $T_{L-}$, $L_{L2}$ and the second freewheeling path ($D_{F2}$, $R_{F2}$). A small part of the current flows through $C_L$.

After the freewheeling paths have been activated, the current through the turn-off capacitor decays exponentially. A 50 Hz oscillation is superposed on this current by the grid. This oscillation forces a current zero crossing to take place. This current zero crossing causes all of the thyristors still carrying current (power converter and turn-off thyristors) to be turned off. As a result, the secondary turn-off operation is also concluded.

Following on from the secondary turn-off operation, readiness for turning off is automatically re-established in that the charge of the capacitor $C_L$ is automatically reversed again to the negative intermediate circuit voltage $(-U_D)$ by way of the charge reversal resistors $R_{L1}$ and $R_{L2}$.

Figure 3:
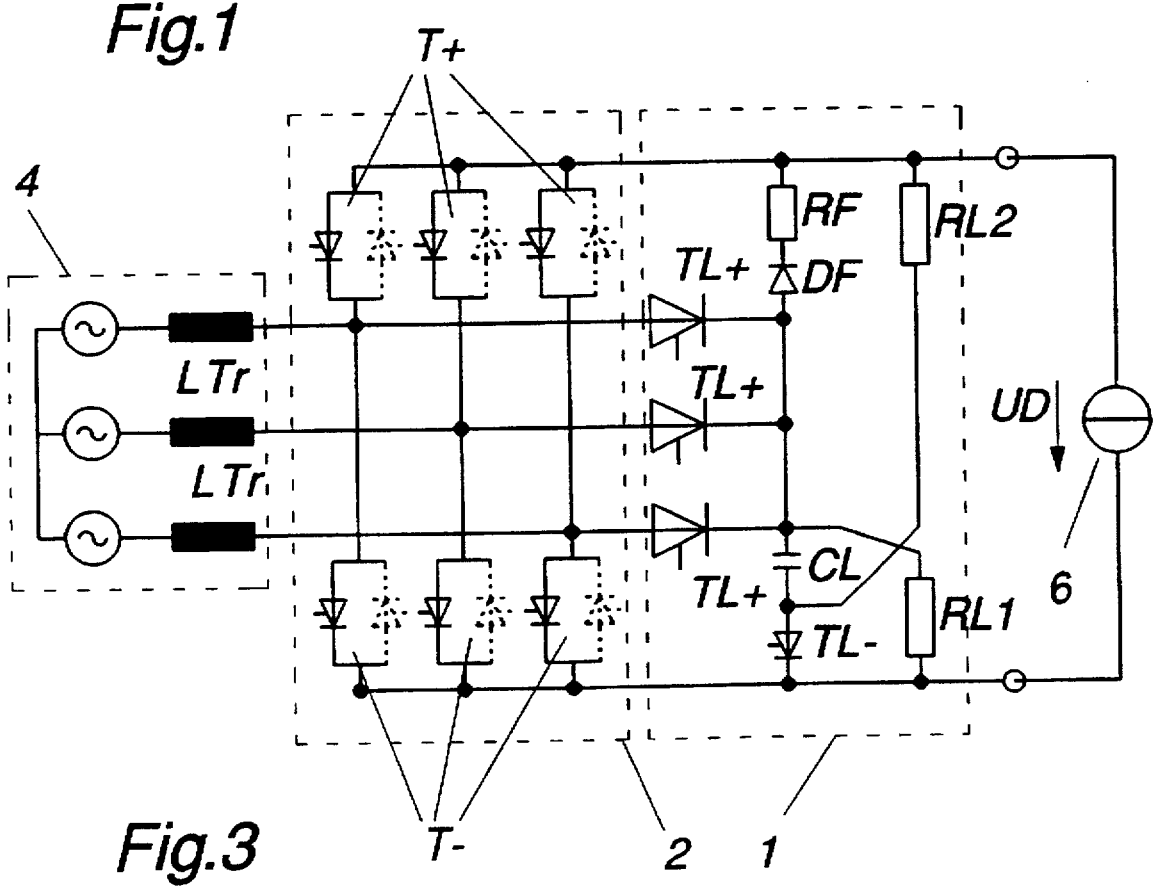
FIG. 3 shows an equivalent circuit diagram of a common turn-off circuit according to the invention which is suitable for a 6-pulse power converter.

FIG. 3 shows the equivalent circuit of a common turn-off circuit which can be used for a six-pulse circuit. The functioning is virtually the same as in the twelve-pulse circuit. The circuit essentially corresponds to the upper half of the twelve-pulse circuit, the three turn-off thyristors $T_{L-}$ and the lower freewheeling path $D_{F2}$, $R_{F2}$ being replaced by a single turn-off thyristor $T_{L-}$. Of course, the grid 4 can also be delta-connected.

Although the invention has been evinced with reference to a railway grid coupling, it is not restricted to circuits of this type, but rather it can be used quite generally for virtually any type of thyristor power converters which are connected to a DC voltage intermediate circuit.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A common turn-off circuit for a power converter (2; 2.1, 2.2) which is equipped with thyristors (T+, T−) and is connected, on the one hand, to an AC voltage grid via a transformer having a specific transformer inductance ($L_T$) and, on the other hand, to a DC voltage intermediate circuit, the common turn-off circuit comprising at least one turn-off thyristor ($T_{L+}$, $T_{L-}$), wherein the turn-off thyristors are connected to the transformer, and wherein a freewheeling path ($R_F$, $D_F$; $R_{F1}$, $R_{F2}$, $D_{F1}$, $D_{F2}$) is provided for receiving energy stored, in particular, in the transformer inductor and in relevant further inductors.

2. The common turn-off circuit as claimed in claim 1, wherein the freewheeling path comprises a series circuit formed by a freewheeling resistor ($R_F$; $R_{F1}$, $R_{F2}$) and a freewheeling diode ($D_F$; $D_{F1}$, $D_{F2}$).

3. The common turn-off circuit as claimed in claim 1, wherein the grid is polyphase, and wherein a turn-off thyristor ($T_{L+}$) is provided for each phase.

4. The common turn-off circuit as claimed in claim 2, wherein (a) the grid and the transformer are polyphase and the anodes of the turn-off thyristors ($T_{L+}$) are connected to a respective phase of the transformer;

(b) the cathodes of the turn-off thyristors ($T_{L+}$) form a common node which is connected, on the one hand, to the positive pole of the DC voltage intermediate circuit via the series circuit formed by the freewheeling resistor ($R_F$) and the freewheeling diode ($D_F$) and, on the other hand, to a turn-off capacitor ($C_L$), the turn-off capacitor being connected to the negative pole of the DC voltage intermediate circuit via a switch (S); and (c) the common connection between the turn-off capacitor and the node of the cathodes of the turn-off thyristors is connected to the negative pole of the DC voltage intermediate circuit via a first charge reversal resistor ($R_{L1}$), and the common connection between the turn-off capacitor and the switch is connected to the positive pole of the DC voltage intermediate circuit via a second charge reversal resistor ($R_{L2}$).

5. The common turn-off circuit as claimed in claim 2, wherein (a) the first power converter is designed as a twelve-pulse series circuit and comprises a first (2.1) and a second power converter element (2.2);

(b) the transformer comprises a first, delta-connected winding group and a second, star-connected winding group, the first power converter element (2.1) being connected to the first winding group and the second power converter element (2.2) being connected to the second winding group;

(c) a turn-off thyristor ($T_{L+}$ and $T_{L-}$) is provided for each phase of the first and of the second winding group, respectively, the cathodes of those turn-off thyristors ($T_{L+}$) which are connected to the first power converter element (2.1) and to the delta-connected winding group forming a first common node, and the anodes of those turn-off thyristors ($T_{L-}$) which are connected to the second power converter element and to the star-connected second winding group forming a second common node;

(d) the first and the second common node are connected to one another via a turn-off capacitor ($C_L$);

(e) the turn-off capacitor ($C_L$) and the first common node are connected, on the one hand, to the positive pole of the DC voltage intermediate circuit via the series circuit formed by a first freewheeling diode ($D_{F1}$) and a first freewheeling resistor ($R_{F1}$) and, on the other hand, to the negative pole of the DC voltage intermediate circuit via a first charge reversal resistor ($R_{L1}$);

(f) the turn-off capacitor ($C_L$) and the second common node are connected, on the one hand, to the negative pole of the DC voltage intermediate circuit via the series circuit formed by a second freewheeling diode ($D_{F2}$) and a second freewheeling resistor ($R_{F2}$) and, on the other hand, to the positive pole of the DC voltage intermediate circuit via a second charge reversal resistor ($R_{L2}$).

6. The common turn-off circuit as claimed in claim 5, wherein a respective turn-off inductor ($L_{L1}$, $L_{L2}$) is provided between the first and second common node and the turn-off capacitor.

7. The common turn-off circuit as claimed in claim 4, wherein the power converter or rather the first and the second power converter elements (2.1, 2.2) are connected to the DC voltage intermediate circuit (6) via a respective smoothing inductor ($L_{D1}$, $L_{D2}$).

8. An AC converter having a first power converter equipped with thyristors and having a second power converter equipped with gate turn-off power semiconductor switches, the first power converter being connected via a transformer to a first AC voltage grid and the second power converter being connected to a second AC voltage grid, and a DC voltage intermediate circuit being provided between the first power converter and the second power converter, wherein a common turn-off circuit as claimed in one of the preceding claims is provided for the first power converter.

9. The common turn-off circuit as claimed in claim 2, wherein the grid is polyphase, and wherein a turn-off thyristor ($T_{L+}$) is provided for each phase.

10. The common turn-off circuit as claimed in claim 3, wherein (a) the grid and the transformer are polyphase and the anodes of the turn-off thyristors ($T_{L+}$) are connected to a respective phase of the transformer;

(b) the cathodes of the turn-off thyristors ($T_{L+}$) form a common node which is connected, on the one hand, to the positive pole of the DC voltage intermediate circuit via the series circuit formed by the freewheeling resistor ($R_F$) and the freewheeling diode ($D_F$) and, on the other hand, to a turn-off capacitor ($C_L$), the turn-off capacitor being connected to the negative pole of the DC voltage intermediate circuit via a switch (S); and (c) the common connection between the turn-off capacitor and the node of the cathodes of the turn-off thyristors is connected to the negative pole of the DC voltage intermediate circuit via a first charge reversal resistor ($R_{L1}$), and the common connection between the turn-off capacitor and the switch is connected to the positive pole of the DC voltage intermediate circuit via a second charge reversal resistor ($R_{L2}$).

11. The common turn-off circuit as claimed in claim 3, wherein (a) the first power converter is designed as a twelve-pulse series circuit and comprises a first (2.1) and a second power converter element (2.2);

(b) the transformer comprises a first, delta-connected winding group and a second, star-connected winding group, the first power converter element (2.1) being connected to the first winding group and the second power converter element (2.2) being connected to the second winding group;

(c) a turn-off thyristor ($T_{L+}$ and $T_{L-}$) is provided for each phase of the first and of the second winding group, respectively, the cathodes of those turn-off thyristors ($T_{L+}$) which are connected to the first power converter element (2.1) and to the delta-connected winding group forming a first command node, and the anodes of those turn-off thyristors ($T_{L-}$) which are connected to the second power converter element and to the star-connected second winding group forming a second common node;

(d) the first and the second common node are connected to one another via a turn-off capacitor ($C_L$);

(e) the turn-off capacitor ($C_L$) and the first common node are connected, on the one hand, to the positive pole of the DC voltage intermediate circuit via the series circuit formed by a first freewheeling diode ($D_{FL}$) and a first freewheeling resistor ($R_{F1}$) and, on the other hand, to the negative pole of the DC voltage intermediate circuit via a first charge reversal resistor ($R_{L1}$);

(f) the turn-off capacitor ($C_L$) and the second common node are connected, on the one hand, to the negative pole of the DC voltage intermediate circuit via the series circuit formed by a second freewheeling resistor ($R_{F2}$) and, on the other hand, to the positive pole of the DC voltage intermediate circuit via a second charge reversal resistor ($R_{L2}$).

12. The common turn-off circuit as claimed in claim 6, wherein the power converter or rather the first and the second power converter elements (2.1, 2.2) are connected to the DC voltage intermediate circuit via a respective smoothing inductor ($L_{L1}$, $L_{D2}$).

* * * * *